(12) United States Patent
Weckesser et al.

(10) Patent No.: US 6,489,058 B1
(45) Date of Patent: Dec. 3, 2002

(54) PASTED POSITIVE ELECTRODE AND PROCESS FOR ITS PRODUCTION

(75) Inventors: John J. Weckesser, Gainesville, FL (US); Canan Balaban, Gainesville, FL (US); Vincent J. Puglisi, Gainesville, FL (US); Robert Czajkowski, Melrose, FL (US); Guy Rampel, Gainesville, FL (US); James Waggoner, deceased, late of Franklin, MA (US), by Dawn L. Waggoner, legal representative; Chao Y. Wu, Gainesville, FL (US)

(73) Assignee: Moltech Power Systems, Gainesville, FL (US)

( * ) Notice: Subject to any disclaimer, the term of this patent is extended or adjusted under 35 U.S.C. 154(b) by 0 days.

(21) Appl. No.: 09/438,237

(22) Filed: Feb. 15, 2000

Related U.S. Application Data

(63) Continuation-in-part of application No. 09/191,562, filed on Nov. 13, 1998.

(51) Int. Cl.⁷ ............................................... H01M 4/32
(52) U.S. Cl. ........................ 429/223; 429/233; 429/241
(58) Field of Search ............................. 429/223, 232, 429/233, 241, 94, 235; 428/613; 29/623.5

(56) References Cited

U.S. PATENT DOCUMENTS

| | | | |
|---|---|---|---|
| 2,724,733 A | | 11/1955 | Hagspihl et al. |
| 3,826,684 A | | 7/1974 | Pensabene |
| 3,898,099 A | | 8/1975 | Baker et al. |
| 4,251,603 A | | 2/1981 | Matsumoto et al. |
| 4,582,098 A | | 4/1986 | Matsumoto et al. |
| 5,798,189 A | * | 8/1998 | Hayashida et al. |
| 5,804,334 A | * | 9/1998 | Yamamura et al. |
| 5,853,919 A | * | 12/1998 | Kohno et al. |
| 5,882,821 A | * | 3/1999 | Miyasaka |
| 5,965,295 A | * | 10/1999 | Bando et al. |
| 6,020,089 A | * | 2/2000 | Harada et al. |
| 6,033,805 A | * | 3/2000 | Dansui et al. |
| 6,156,455 A | * | 12/2000 | Yamamura et al. |

FOREIGN PATENT DOCUMENTS

| | | |
|---|---|---|
| EP | 0 801 430 | 10/1997 |
| EP | 0 827 224 | 3/1998 |
| JP | 63-170853 | 7/1988 |
| JP | 01-248472 | 10/1989 |
| JP | 03-165469 | 7/1991 |
| JP | 04-259753 | 9/1992 |

OTHER PUBLICATIONS

Patent Abstracts of Japan, vol. 015, No. 405, corresponding to JP 03–165469 (Oct. 16, 1991).
Patent Abstracts of Japan, vol. 017, No. 044, corresponding to JP 04–259753 (Jan. 27, 1988).
Patent Abstracts of Japan, vol. 012, No. 435, corresponding to JP 63–170853 (Nov. 16, 1988).
Patent Abstracts of Japan, vol. 013, No. 594, corresponding to JP 01–248472 (Dec. 27, 1989).

* cited by examiner

*Primary Examiner*—Tom Dunn
*Assistant Examiner*—Jonathan Johnson
(74) *Attorney, Agent, or Firm*—Sven W. Hanson; Jacqueline Nicol

(57) ABSTRACT

The present invention provides a positive electrode for a rechargeable cell including a two-dimensional electrically conductive substrate supporting a coating comprising nickel hydroxide and a binder, preferably a styrene-ethylene/butylene-styrene triblock copolymer binder. The coating is formed by applying a paste to the two-dimensional substrate surface. The present invention also includes the cell made therefrom. The present invention further provides a method of producing this electrode including the steps of forming the paste and coating the paste onto the two-dimensional substrate. The capacity, midpoint voltage and power delivery of the coated electrode are comparable to or exceed those of traditional sintered and foam positive electrodes.

5 Claims, 8 Drawing Sheets

PASTED POSITIVE ELECTRODE AND PROCESS FOR ITS PRODUCTION

This application is a continuation-in-part of U.S. patent application Ser. No. 09/191,562, filed Nov. 13, 1998, the contents of which are incorporated herein by reference in their entirety.

BACKGROUND OF THE INVENTION

1. Field of the Invention

This invention relates to improved positive electrodes for use in rechargeable cells, and a process for producing same. More particularly the invention pertains to positive electrodes wherein a paste containing an electrochemically active material and a binder is coated on at least a portion of at least one of the opposing major surfaces of a two-dimensional electrically conductive substrate.

2. Description of Prior Art.

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

There are a number of processes to form positive electrodes for use in rechargeable cells. One well known method involves sintering. Sintered positive nickel hydroxide electrodes are typically formed by sintering nickel powder at elevated temperatures to form a porous three dimensional plaque and then impregnating this porous structure with nickel salts which are subsequently converted to nickel hydroxide. As used herein, a three-dimensional substrate refers to a porous substrate having at least a portion of its interior surface area in contact with electrochemically active material. U.S. Pat. No. 2,724,733, for example, describes a sintered electrode structure for a nickel cadmium cell having nickel hydroxide as the active material for the sintered positive electrode. U.S. Pat. No. 3,826,684 also describes a nickel cadmium cell having a sintered positive nickel electrode containing additives to enhance charge acceptance. However, the manufacturing process for the sintered electrode is capital intensive. The porous three-dimensional sinter plaque structure is impregnated by immersing the plaque in a nickel salt bath and converting the nickel salt to nickel hydroxide by the reaction of the salt with caustic. In order to obtain an electrode containing a sufficient amount of active material, this immersion step must be repeated several times. The sintered nickel electrode therefore requires a costly, complicated and time consuming process for its fabrication.

Another process to form the positive electrode involves forming a paste from nickel hydroxide and other additives and depositing the paste into an appropriate three-dimensional substrate. Such three-dimensional substrates are typically formed by nickel plating polyurethane foams, non woven felts and carbon fiber mats, and are referred to in the art as sponge metal, foamed porous metal, porous metal matrix, and felt. U.S. Pat. Nos. 4,251,603 and 4,582,098 are representative of processes which utilize a sponge-like three-dimensional porous metal matrix to form the electrode. Specifically, U.S. Pat. No. 4,251,603 describes a battery electrode having a carrier made of a sponge-like porous metal matrix having a multiplicity of spaces throughout. An active material paste fills the matrix followed by drying, calendering and cutting to the desired size. U.S. Pat. No. 4,582,098 describes a method of spraying a pasty mixture into a porous three-dimensional metal body from both sides so as to fill the pores with the mixture. As compared to sintered electrodes, foam electrodes provide greater capacity, e.g., 1250 mAH as compared to 1100 mAH in a typical AA cell. The higher porosity of the foam material is believed to contribute to the greater capacity of the foam electrode. However, the materials and manufacturing costs for foam positive electrodes are also high.

Both of these processes for manufacturing a positive electrode require that a porous three-dimensional substrate be filled with active material, a process more costly and complex than a coating process. Efforts have been undertaken to provide for a rechargeable positive electrode with a two-dimensional current collector substrate supporting a layer of active material on each major surface of the substrate. As used herein, a two-dimensional current collector or electrically conductive substrate refers to a substrate such as a foil sheet where the substrate thickness is not coextensive with the electrode thickness and the electrochemically active material contacts essentially the external surface area of the substrate. Volume changes that occur in the positive electrode have hampered efforts to provide satisfactory adhesion between the two-dimensional conductive substrate and the active material when the material is coated onto the substrate. As a result, the active material separates from the substrate, reducing capacity and increasing resistance. Various non-coating methods for forming a positive electrode with a two-dimensional current collector substrate have been proposed. For example, U.S. Pat. No. 3,898,099 describes an electrode sheet formed of active material and polytetrafluoroethylene (PTFE) fibers as a binder wherein the sheet is subsequently pressed onto a metal screen or foil current collector. This process is complex in that the active material electrode sheet is formed by repeated working of the paste by rolling and folding in order to form a cohesive sheet. A current collector substrate is then sandwiched between sheets to form the electrode assembly followed by additional pressure to the assembly to form the finished electrode. Another proposed solution to the adhesion problem for a positive electrode using a two-dimensional substrate is to corrugate a two-dimensional substrate and then apply a thin sintered metal layer on the surfaces of the corrugated substrate prior to coating with an active material. The required additional working of the substrate to provide a corrugated profile adds additional manufacturing costs to the electrode.

Accordingly, there is a need in the art for a positive electrode that can be manufactured using a simple coating process, and that is cost competitive with the sintered positive electrode and performance competitive with the foam positive electrode.

BRIEF SUMMARY OF THE INVENTION

It is therefore one object of the present invention to provide an improved positive nickel electrode for rechargeable electrochemical cells having comparable or enhanced capacity as compared with sintered and foam positive electrodes.

Yet another object of the present invention is to provide a simple method of manufacturing a positive nickel electrode for a rechargeable cell by coating a two-dimensional substrate with a paste comprising active material and a binder.

To achieve the foregoing and other objects and advantages and in accordance with a purpose of the present invention, as embodied and broadly described herein, a positive electrode is provided comprising a two-dimensional electrically conductive substrate having at least a first major surface and a second major surface opposing the first surface, and a coating contacting at least a portion of at least one of the first and second surfaces, the coating comprising nickel hydroxide as an active material in the discharged state and a binder, wherein the porosity of the final electrode coating is from about 15 to 35 per cent. Preferably, the substrate thickness is between 10 and 50 per cent of the final electrode thickness. The binder is preferably a styrene-ethylene/butylene-styrene triblock copolymer binder. Preferably the nickel hydroxide active material is co-precipitated with zinc and cobalt. Other metal hydroxides as are known in the art can also be used. Preferably, the substrate comprises perforated nickel plated steel strip with nickel powder sintered to at least a portion of said strip. The coating can additionally comprise additives of nickel, cobalt, cobalt oxide, cobalt hydroxide, carbon, graphite, zinc oxide or zinc hydroxide, or combinations thereof.

The within invention additionally provides a method for making such an electrode, comprising the steps of preparing a paste preferably comprising the active material and the binder in a solvent, delivering the paste to a coating or extrusion device and feeding the substrate through the coating die while the paste is preferably applied to both major surfaces of the substrate. Preferably, the electrode is then passed through an oven to remove the solvent, and calendered to a desired thickness that provides the desired coating porosity.

As will be appreciated by one of skill in the art, features of one aspect or embodiment of the invention are also applicable to other aspects or embodiments of the invention.

DETAILED DESCRIPTION OF PREFERRED EMBODIMENTS

The present invention provides a positive electrode comprising a two-dimensional electrically conductive substrate having a first major surface and a second major surface opposing the first surface. A coating contacts at least a portion of at least one of the substrate surfaces. The coating comprises an electrochemically active material, such as nickel hydroxide, and a binder, and can additionally include additives to increase the electrode performance, such as nickel, cobalt and carbon compounds, or combinations thereof. The present invention also includes the cell made therefrom. The present invention further provides a method of producing this electrode including the steps of forming a paste and applying the paste to the substrate.

The positive electrode of the present invention, while preferably intended for use with a metal hydride negative electrode in alkaline electrochemical cells which are hermetically sealed or equipped with a resealable safety valve, may also be used in semi-sealed or flooded cells, and matched opposite different negative electrodes. While the positive electrode described herein possesses the flexibility required for winding to form jellyrolls for standard cylindrical cells, such as AA, C and D size cells and the like, the jellyroll configuration being specifically embodied herein, prismatic cells, button cells or other configurations may also be produced with the positive electrode of the present invention. For cylindrical electrodes, the initial substrate thickness is preferably not more than 0.25 millimeters. For non-cylindrical electrodes, the substrate thickness is preferably not more than 0.5 millimeters.

Figure 1:
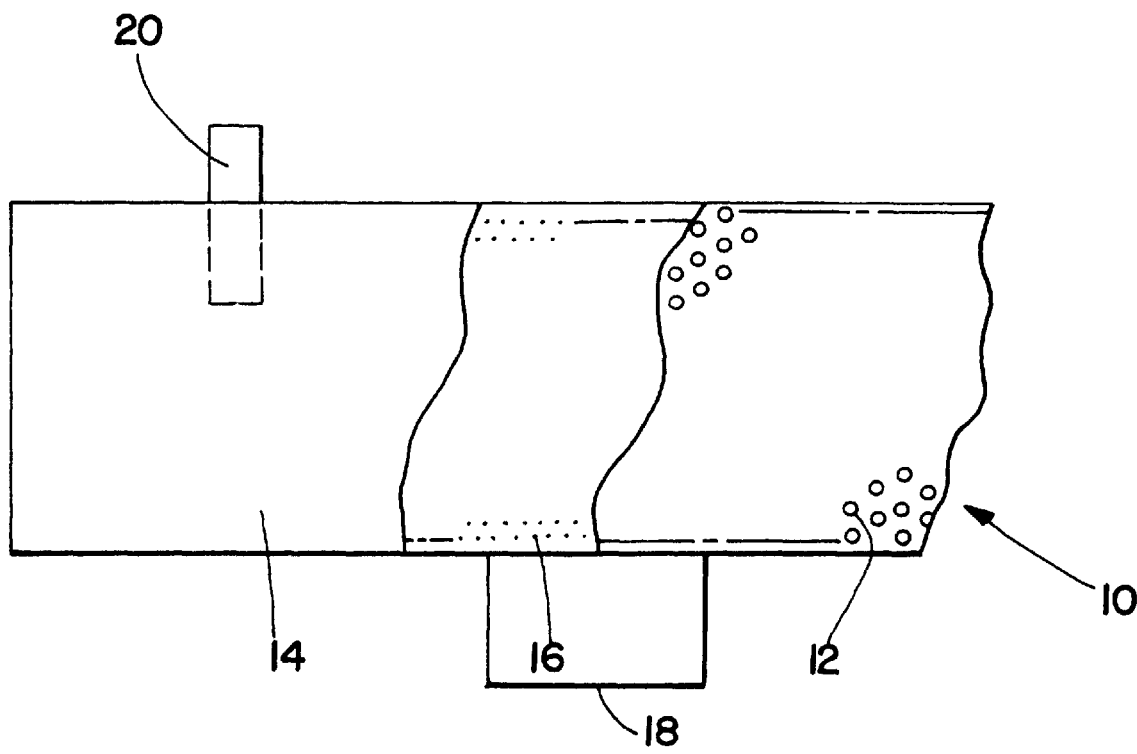
FIG. 1 is a top partially broken away view of a positive electrode constructed in accordance with the present invention.
Figure 2:
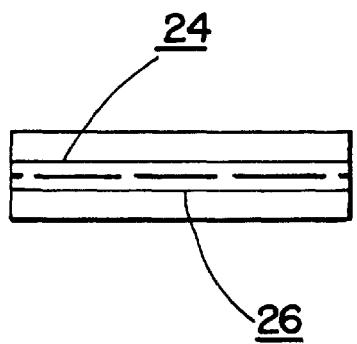
FIG. 2 is a side view in cross section of a positive electrode constructed in accordance with the present invention.

Referring now to FIGS. 1 and 2, a preferred embodiment of the positive electrode of the present invention is shown generally at 10 and includes an electrically conductive substrate 18 on which is supported a coating 14 comprising an electrochemically active material and a binder, and may also include additives to enhance the electrode performance.

The electrically conductive substrate 18 may be formed of any suitable electrically conductive material compatible with the components of the cell and the process described herein. The two-dimensional electrically conductive substrate provides conductive support for the active material of the electrode of the present invention and may be configured as desired for a particular application. For the jellyroll application exemplified herein, the substrate support member 18 comprises an elongated essentially flat strip 12 and at least a first major surface 24 and a second major surface 26 opposing said first surface. Such substrate support members for purposes of practicing the within invention include nickel plated steel sheet, sometimes referred to in the art as foil. In a preferred embodiment, the foil has an initial thickness of about 0.02 to about 0.12 millimeters, more preferably about 0.04 to 0.10 millimeters, and even more preferably about 0.05 to 0.08 millimeters. Preferably, the strip 12 is perforated to allow at least a portion of the coating to penetrate through the strip forming a continuous conductive matrix throughout the electrode. In a preferred embodiment the strip 12 has an open area of about 20 to 60 per cent of the total area, more preferably an open area of about 30 to 40 per cent of the total area, and even more preferably an open area of about 38 per cent of the total area.

The first and second major surfaces 24, 26 of the substrate 18 may comprise surface modifications to enhance the adhesion of the coating to these surfaces, such as stippling, embossing, plasma arc spraying or rough nickel plating, as are known in the art. Preferably, the first and second major substrate surfaces comprise a thin layer of metal powder 16 that has been sintered to the surface of the strip 12 as is known in the art. Most preferably the metal powder is a nickel powder. This thin sinter preferably permits at least a portion of the perforations in the underlying strip to remain open, allowing at least a portion of the coating to extend from one substrate surface to the other forming a continuous conductive matrix. The thin sinter thickness on each side of the underlying strip preferably ranges from about 0.02 to 0.1 millimeters, and more preferably from 0.03 to 0.05 millimeters. A preferred embodiment of the within invention utilizes a thin sinter coating of about 0.045 millimeters on each side of a 0.0635 millimeter thick perforated foil strip. The substrate 18 may also be provided with a solid margin or border (not shown) on one or more of its edges which is free of paste to accommodate electrical connections to a current collector or one of the terminals of the cell in which the electrode is utilized. For this purpose, an optional current collector tab 20 may also be used (or in lieu of the margin) as is known in the art.

The electrochemically active material preferably comprises nickel hydroxide in the discharged state, preferably co-precipitated with zinc and cobalt. As used herein, a "co-precipitated" element means that the element is integral to the crystalline structure of the nickel hydroxide in the discharged state and the crystalline structure of the nickel oxyhydroxide in the charged state. Preferably, the nickel hydroxide is co-precipitated with three to five weight per cent zinc and one to two weight per cent cobalt. In one preferred embodiment the nickel hydroxide active material is co-precipitated with five weight per cent zinc and one weight per cent cobalt. Such co-precipitated nickel hydroxide is manufactured by Tanaka Chemical Co. and is available from Sumitomo Corporation, Atlanta, Ga. Preferably the nickel hydroxide has a high tap density ranging from about 1.5 to about 2.2 grams per cubic centimeter, and more preferably from 2.0 to 2.2 grams per cubic centimeter.

The coating further comprises a binder. The binder is preferably a styrene-ethylene/butylene-styrene (S-EB-S) triblock copolymer such as "Kraton®G1654" available from Shell Chemical Co., Houston, Tex. Other suitable binders include "Kraton®G1651" and "Kraton®G1652" both commercially available from Shell Chemical Co. The preferred binder has an elongation of from 500 to 700 per cent, a tensile strength of from 3500 to 5500 pounds per square inch and a styrene/rubber ratio of from 29/71 to 33/67.

The coating further preferably includes nickel, cobalt, carbon or zinc compounds, or combinations thereof, as additives to improve various aspects of the performance of an electrochemical cell using the electrode of the present invention. Nickel flake, nickel powder, and graphite or combinations thereof, can be used as additives to increase conductivity. Any cobalt compound that can be converted upon charging to cobalt oxyhydroxide (CoOOH), such as cobalt oxide (CoO), can also be used as an additive to increase conductivity. Zinc oxide or zinc hydroxide additives can also be employed to improve cycle life. In an alternate preferred embodiment, the coating may exclude the cobalt oxide additive by substituting equivalent portions of nickel or nickel hydroxide therefor, as described in more detail below.

The substrate 18 supports a coating 14 on at least a portion of at least one of the major surfaces 24, 26 of the substrate. Where the particular application is enhanced by coating at least a portion of both major surfaces, the coating preferably extends through a plurality of perforations in the substrate 18 to connect the coating on each major surface. This structure provides a continuous conductive matrix throughout the electrode.

In one embodiment, the coating is formed from a paste comprising a powder mixture and a solvent, the powder mixture comprising an electrochemically active material and a binder, and optionally additives to improve cell performance, as described above. In one embodiment, the powder mixture preferably comprises about 50 to 95 per cent by weight of electrochemically active material, about 0.3 to 5.0 per cent by weight of binder and about 0 to 50 percent by weight of one or more other additives, as described above. As will be appreciated by one skilled in the art, the weight per cent chosen for the electrode components will be dependent upon the density or molecular weight of the materials in the powder mixture.

In one embodiment, the powder mixture comprises about 50 to 90 per cent by weight of nickel hydroxide, about 0 to 10 per cent by weight of cobalt compounds, about 0.3 to 5.0 per cent by weight of binder, and about 2 to 50 per cent by weight of other additives, such as nickel and carbon compounds, or combinations thereof, as described above. In one embodiment, the powder mixture comprises about 0.5 to 3.0 per cent by weight of binder.

In one embodiment, the coating is formed from a paste comprising a powder mixture and a solvent, the powder mixture comprising the co-precipitated nickel hydroxide, cobalt metal powder and graphite additives, in a predetermined proportion of about 77 to 95 per cent by weight of nickel hydroxide, about 0 to 10 per cent by weight of Co, about 2 to 10 per cent by weight of graphite, and about 0.3 to 5.0 per cent by weight of binder. In one preferred example, the powder mixture comprises about 90.2 weight per cent of nickel hydroxide, 4.9 weight per cent of Co metal powder, 3.9 weight per cent of graphite and 1 weight per cent of binder.

In a preferred embodiment, the coating is formed from a paste comprising a powder mixture and a solvent, the powder mixture comprising the co-precipitated nickel hydroxide and cobalt oxide (CoO) and nickel powder additives, in a predetermined proportion of about 50 to 90 per cent by weight of nickel hydroxide, about 0 to 10 per cent by weight of CoO, about 10 to 50 per cent by weight of nickel powder 210, and about 0.3 to 5.0 per cent by weight of binder. In one embodiment, the powder mixture comprises about 0.5 to 3.0 per cent by weight of binder. In one embodiment, the powder mixture comprises about 50 and 75 per cent by weight of nickel hydroxide and about 20 to 45 percent by weight of nickel powder. In one preferred example, the proportions are about 74.2 weight per cent nickel hydroxide, 5.0 weight per cent CoO, 19.8 weight per cent nickel powder 210 and 1 weight per cent binder.

A solvent is used to provide a paste from the combined dry components. The solvent used is preferably mineral spirits 66/8 in the amount of 5 to 30 per cent by weight of dry paste, typically about 18 per cent by weight. Other similar solvents may be utilized as known in the art.

If a cobalt additive is desired in the electrode of the present invention, certain processing of the electrode is carried out to convert the cobalt into its conductive form, i.e., from a soluble and relatively non-conductive form to cobalt oxyhydroxide, an insoluble and relatively conductive form. Preferably, this conversion process using a starting material of cobalt oxide comprises allowing the cell to stand for about 7 days to equilibrate. Then, a first electrical charge is conducted at C/50 for about 5 hours to convert the cobalt starting material to cobalt oxyhydroxide. Such time is, in part, dependent on the starting form of the cobalt compound (s), for example, cobalt metal or cobalt oxide, and the quantity of cobalt species in the electrode. The process is followed by a more routine charge/discharge protocol, such as C/3 charge for 5 hours and C discharge. In an alternative embodiment, where the starting form of the cobalt compound is cobalt metal powder and the electrode of the cell further comprises graphite, the conversion preferably comprises allowing the cells to stand for about 1 day to 7 days at a temperature of 40° C. to 60° C. to equilibrate. Then a first electrical charge is conducted at C/50 for about 5 to 20 hours. This process is followed by a more routine charge/discharge protocol, such as C/3 charge and C discharge. In one preferred embodiment, the cell is allowed to stand for 2 days at 60° C., followed by a first electrical charge at C/50 for 16 hours, and subsequent routine charge/discharge as described above. The heat treatment significantly improves the cobalt conversion efficiency and lowers cell impedance. Extending the first electrical charge time to 16 hours partially changes the nickel hydroxide to the more conductive nickel oxyhydroxide, further improving the electrode conductivity, eliminating polarization on subsequent C/3 charge cycles and improving electrode utilization.

Figure 3:
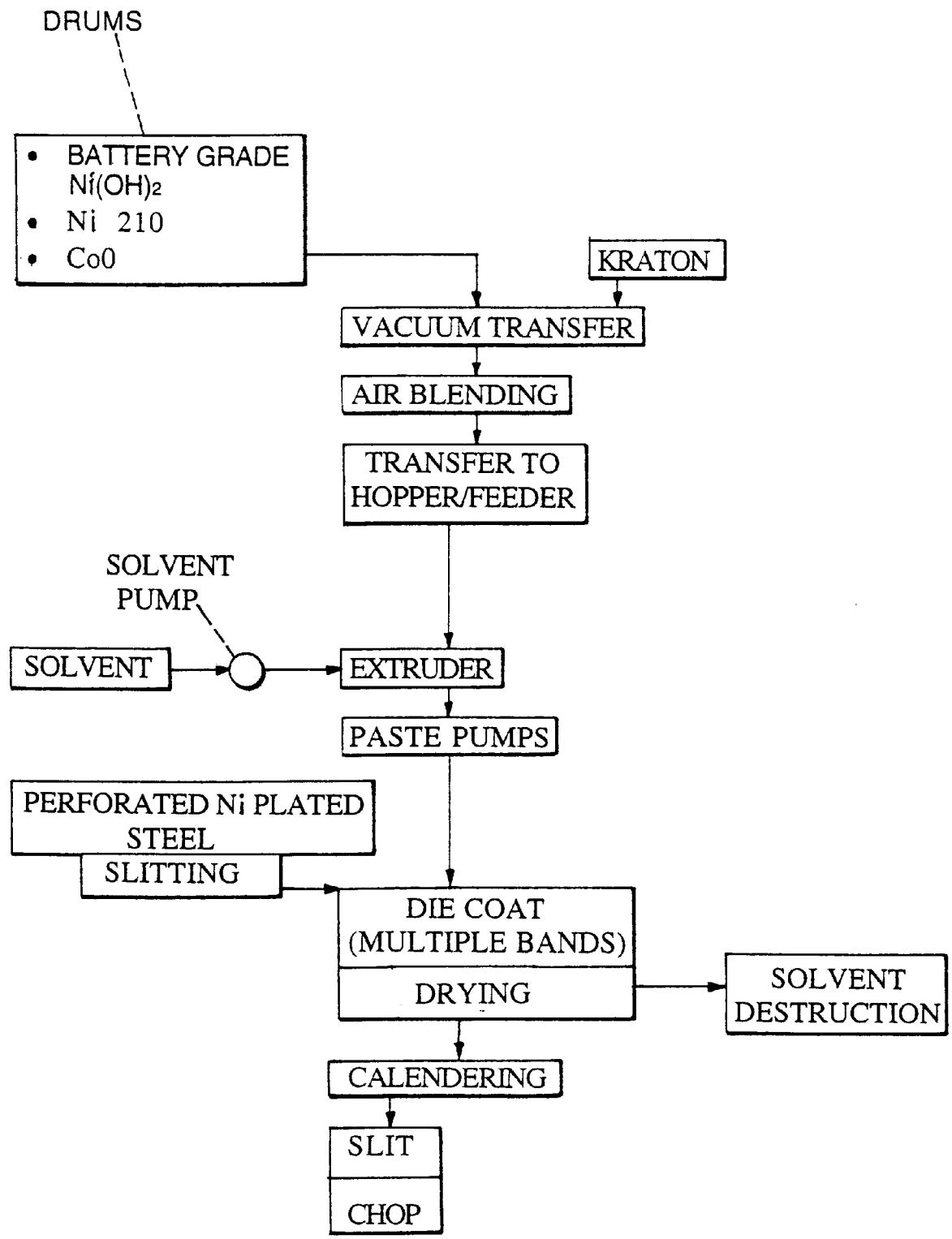
FIG. 3 is a process flow chart illustrating the manufacture of the positive electrode of the present invention.

A preferred process for producing a positive electrode in accordance with the invention is illustrated in FIG. 3. Initially, the preferred starting materials are provided, i.e., battery grade nickel hydroxide, nickel powder, cobalt oxide and binder for the paste. These starting materials are transferred via vacuum, or other appropriate means, to an air blender where they are thoroughly mixed and then are delivered to the hopper/feeder and then delivered to the extruder to be mixed with solvent delivered through a pump.

After thorough mixing, the resultant paste or slurry mixture is applied to electrically conductive substrate by delivering the mixture preferably at a constant volumetric flow rate obtainable by a pump to a coating or extrusion device such as coating or extrusion die. The substrate is passed through the coating die from a payoff roll. As the substrate passes through the coating die, the paste mixture is applied preferably to both sides of the substrate to form outer layers, as well as filling the interstices in the perforated substrate. The coating distribution and paste weight are maintained within suitable tolerances by controlling the speed of the substrate through the coating die or the delivery rate of the paste to the die. Preferably, the mass per unit area of the paste coating as dried but not calendered ranges from 0.08 $g/cm^2$ to 0.26 $g/cm^2$.

Then the paste coated substrate is passed through an oven along a sufficient path length and with adequate residence time to remove the solvent from the paste. Oven residence times in the range from about 0.5 to about 5.0 minutes have been found suitable for electrodes with a final electrode thickness after calendering of about 0.25 millimeters to about 0.75 millimeters After withdrawal from the oven, the continuously pasted plate may be subject to further operations such as calendering, accumulation and take up on take up roll, and subsequent cutting, trimming, or post-application of tabs (not shown). Calendering may be utilized to achieve a preferred final electrode coating porosity of between 15 and 35 per cent. The electrode of the present invention can achieve this preferred final coating porosity range by utilizing an initial substrate thickness that is from 10 to 50 per cent of the final electrode thickness. The energy density of the electrode of the present invention ranges from about 333 to about 700 milliampere-hours per cubic centimeter.

Figure 4:
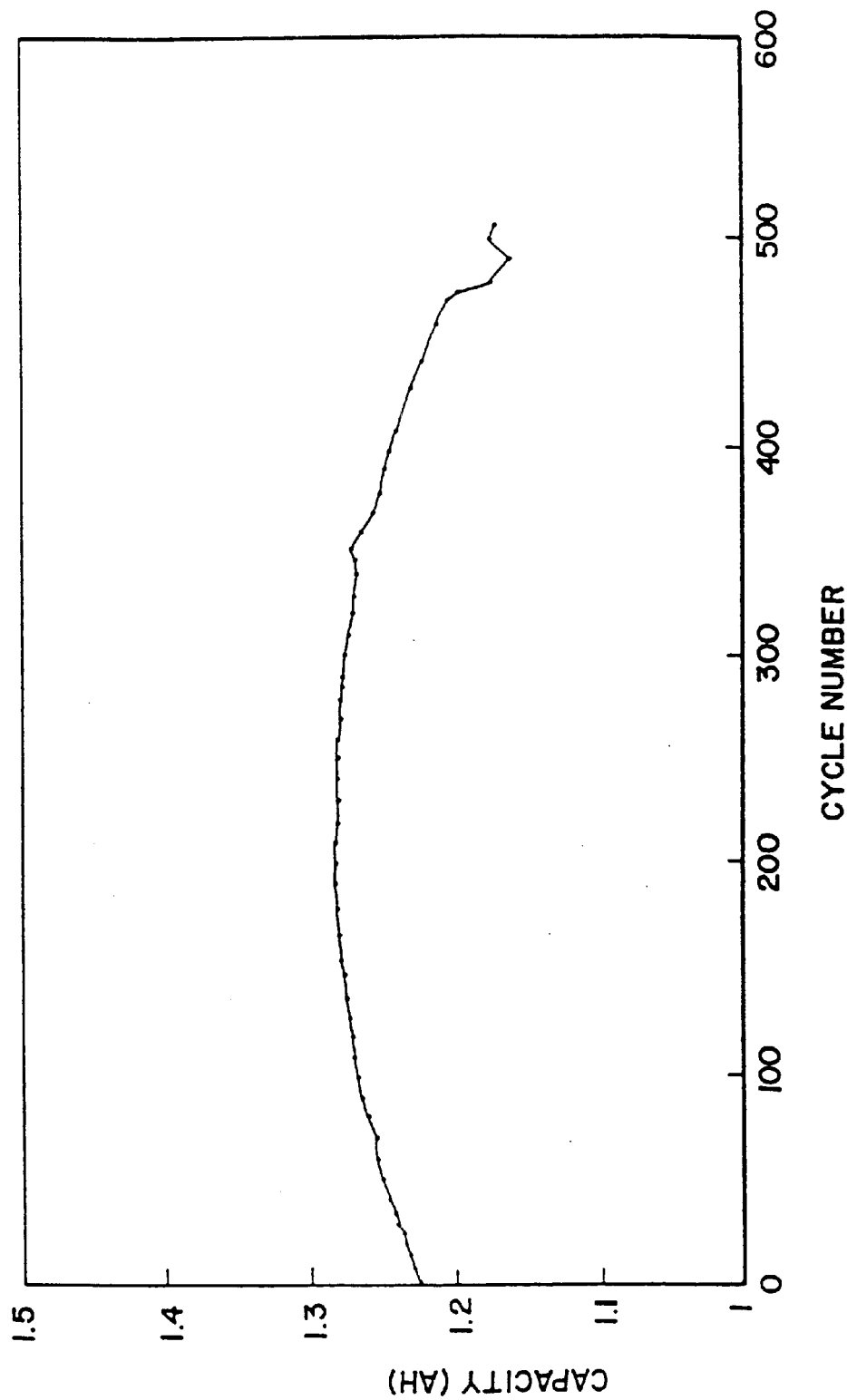
FIG. 4 is a graph plotting capacity of a nickel metal hydride (NiMH) AA cell having the positive electrode of the present invention as a function of cycle number.
Figure 5:
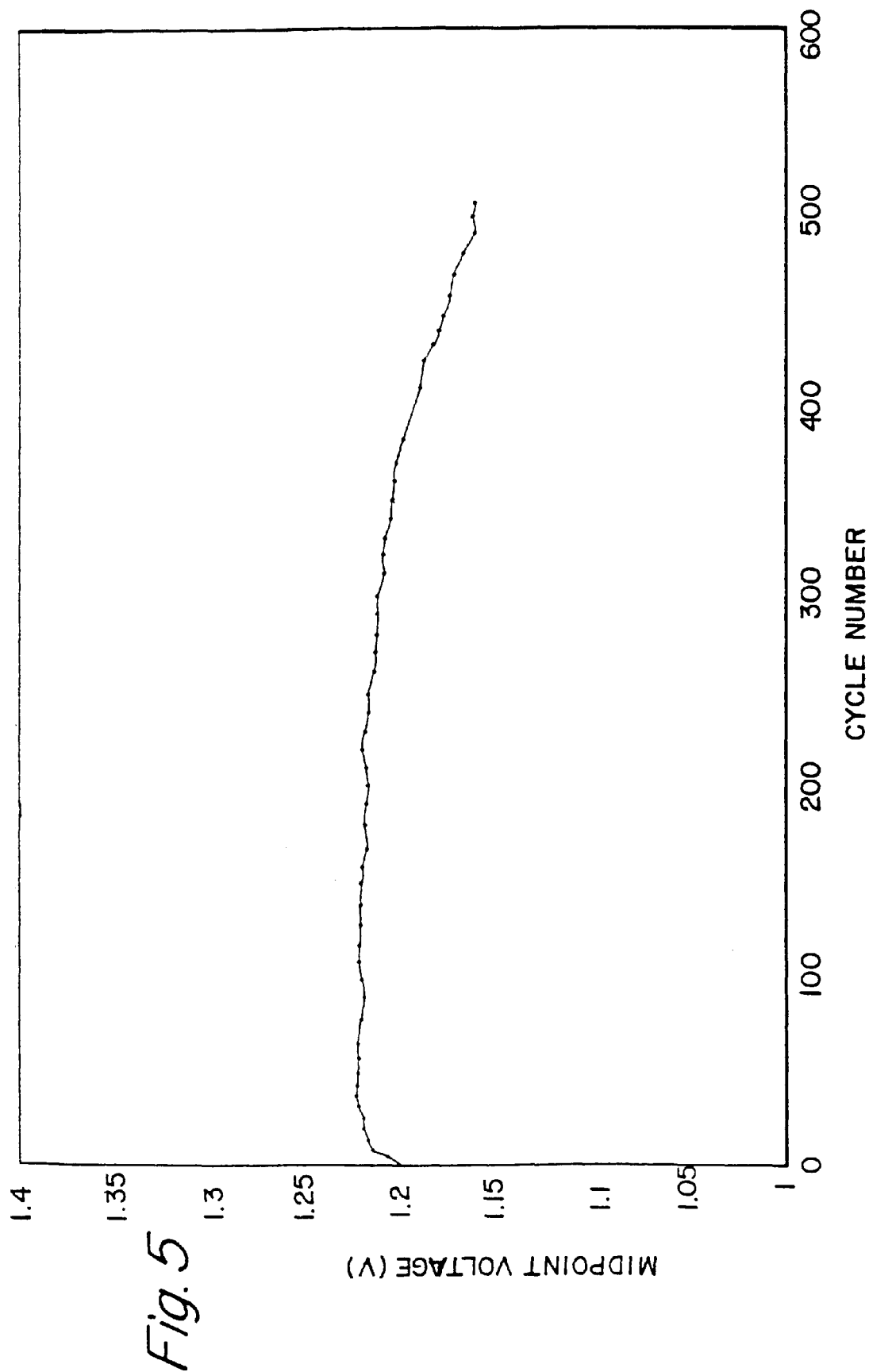
FIG. 5 is a graph plotting discharge midpoint voltage of a NiMH AA cell having the positive electrode of the present invention as a function of cycle number.

The performance of cells comprising a pasted positive electrode of the present invention are illustrated in FIGS. 4 and 5. The nickel hydroxide active material used in the positive electrode of the cell in FIGS. 4 and 5 is co-precipitated with 5 weight per cent zinc and 1 weight per cent cobalt. FIG. 4 is a graph of cell capacity with cycling of a AA nickel metal hydride cell including a pasted positive electrode of the present invention. The cell maintains a capacity of more than 96 per cent of its initial capacity for over three hundred and eighty cycles. FIG. 5 is a graph of the mid point voltage with cycling of a AA nickel metal hydride cell including a pasted positive electrode of the present invention. The mid point voltage of the cell remains above 1.2 volts for approximately 470 cycles and is indicative of acceptable performance.

Several embodiments of the present invention are described in the following examples, which are offered by way of illustration and not by way of limitation.

EXAMPLE 1

In this example, dry powders of nickel hydroxide co-precipitated with 5 weight per cent zinc and 1 weight per cent cobalt (from Tanaka), 210 nickel powder (available from Inco Ltd., Toronto, Ontario), cobalt oxide powder (from Tanaka) and Kraton®G1654 binder (from Shell Chemical) are transferred from loss-in-weight feeders into an air blender where a uniform mixture of these powders can be made. Preferred proportions of these materials are about 74.2 weight per cent co-precipitated nickel hydroxide, 5 weight per cent cobalt oxide, 19.8 weight per cent nickel 210 powder and 1 weight per cent binder. The uniform mixture of powders is then transferred utilizing dense phase conveying or vacuum conveying to a receiving hopper. From this hopper, the blended powder is then fed via another loss in weight feeder into an extruder. Simultaneously, Kwik Dri (Ashland Chemical), a form of mineral spirits, the solvent used in the paste formulation, is metered into the extruder such that a solvent content of about 15 per cent of the total paste weight is achieved. The paste is then fed into paste feed pumps. Although the paste, at this point, is of such quality that it can fed directly into a coating die, the paste pumps are used instead so as to allow better control in the metering of the paste onto the substrate. At all points throughout the process, the paste should be at an approximate temperature of 32 to 35 degrees Celsius and the paste should be fluid.

At the coating die, the paste is applied in a thin film coating of approximately 0.5 to 1 millimeters onto a nickel-plated perforated steel, or foil, substrate strip 0.0635 millimeters thick having a fine layer of nickel powder sintered onto its surface to form a thin sintered substrate. The sintered nickel layer improves adhesion of the paste to the substrate. The sintered nickel surface is about 0.045 millimeters thick on each of the opposing surfaces of the foil, resulting in an initial substrate thickness (prior to application of the paste) of about 0.15 millimeters. The mass per unit area of the thin sinter layer is approximately 0.007 $g/cm^2$. The open area of the foil prior to application of the thin sinter is about 38 per cent. The mass of paste applied per unit area is approximately 0.197 $g/cm^2$. The pasted substrate is then dried in a conventional infrared oven. Typical line speeds for this process may be on the order of 1.5 to 3 meters per minute. The dried material is then taken up onto a reel for further processing. To obtain the target densities of the finished electrode, that is, about twenty per cent as a final electrode coating porosity in this example, the material must be calendered to the finished electrode thickness which is approximately 0.635 millimeters.

In order to obtain a finished electrode suitable for use in an electrochemical cell, paste must be removed so that a tab or current collector can be attached to the electrode prior to final assembly. One approach to paste removal used is milling a small section from a portion of one side of the electrode to remove paste at that location. The electrode can then be tabbed after removing residual paste via a brushing operation. Another example of paste removal used is the continuous removal of paste from one of the longitudinal edges of one side of the electrode surface so that a current collector might be later applied. This action can be obtained by peeling the paste at the paste-substrate interface and brushing off the residual paste. The electrode is now ready for assembly into cells.

EXAMPLE 2

In this example, powders of Tanaka nickel hydroxide co-precipitated with 3 weight per cent zinc and 2 weight per cent cobalt, Tanaka cobalt oxide and Kraton®G1654 binder are blended in a Patterson-Kelly "V" blender for 30 minutes to obtain a homogenous powder mixture. To prepare a 7.1 kilogram batch of paste, 4452 grams of nickel hydroxide, 300 grams of cobalt oxide and 60 grams of binder are blended. In a Ross planetary mixer, 1080 grams of solvent are added and heated to 32 degrees Celsius. Nickel 210 powder (1188 grams) is added to the warm solvent to displace entrained air from the powder. The wetted nickel powder is first stirred with a spatula and then mixed with the Ross mixer for 5 minutes. After this initial wetting of the nickel powder with solvent, half of the dry powder blend (nickel hydroxide, cobalt oxide and binder) is mixed into the wetted nickel powder in the Ross mixer for a period of 10 minutes. The other portion of the dry powder blend is added and the paste mixed for an additional 10 minutes. The paste is then mixed for 60 minutes under vacuum. Vacuum is used to remove any entrapped air in the paste to maintain a dense, viscous final paste.

The paste is transferred into a jacketed cylindrical vessel. The vessel is kept at 49 degrees Celsius. A piston is placed on top of the paste and the vessel closed. From the bottom of the vessel, a port connects the vessel to a "Y" tube, which feeds two paste pumps. These pumps are attached to a closed, jacketed die body and are used to accurately meter the paste to each face of a thin sintered substrate of the type used in Example 1 as the substrate passes through the die. The die is kept at about 43 degrees Celsius in this example, although this temperature may be adjusted to obtain the desired paste coating. After all connections have been made, the piston above the paste in the cylindrical vessel is pressurized to about 4 atmospheres in order to feed the paste pumps. The paste pumps are adjusted to obtain the desired coated paste weights.

After applying the paste onto the substrate, the coated material is then dried in an infrared oven. The material should be dried such that after removal from the drying oven, the coated material has a minimal amount of residual solvent (approximately 1 weight per cent) as measured by an Ohaus moisture balance, but is not dried so much that the material no longer adheres to the substrate. The material is then calendered so that a desired paste porosity of approximately 20 per cent is obtained as determined via calculation from paste and plate weight data and assuming true densities of components. For this example, this corresponds to an electrode thickness of 0.637 millimeters. From this strip, paste is removed along one edge of the coated material so that a current collector can later be applied after winding the electrode along with the opposing electrode and a separator into a jellyroll configuration. The edge cleaned material can now be cut into electrode stock. For this example, the electrode dimensions are 21.25 centimeters in length and 3.327 centimeters in width. These electrodes were wound with metal hydride anodes using conventional winding techniques to obtain cells having a capacity of 2.7 amperehours and an electrode energy density of 0.669 amperehours per cubic centimeter.

EXAMPLE 3

In this example, positive electrodes are made by the same process as described in Example 1, without using a cobalt oxide additive. The electrode composition as a dry paste in this example is 74.2 weight per cent of the Tanaka co-precipitated nickel hydroxide of Example 2, 24.8 weight per cent Inco nickel 210 powder and 1 weight per cent Kraton®G1654 binder. By utilizing this formulation, there is a net decrease in nickel hydroxide efficiency from about 93 per cent of the theoretical value of 289 mAH/g for nickel hydroxide to about 80 per cent of theoretical.

One advantage of this approach is that there is no "precharge" associated with this design. "Precharge" can be considered as any charge supplied to the negative electrode material which does not discharge under normal cycling conditions. The irreversible conversion of cobalt oxide to cobalt oxyhydroxide in the positive electrode during cell formation results in precharge in the negative electrode. This results in a corresponding increase in the state of charge of the negative electrode. By eliminating this "precharge," less negative electrode material is necessary and a thinner negative electrode can be used. As a result of incorporating a thinner negative electrode material in the cell design, longer electrodes can be utilized, thus compensating for some of the loss in efficiency.

A further advantage to eliminating cobalt additives from the paste is that the formation procedures for effective conversion of cobalt oxide to cobalt oxyhydroxide are not necessary.

Figure 6:
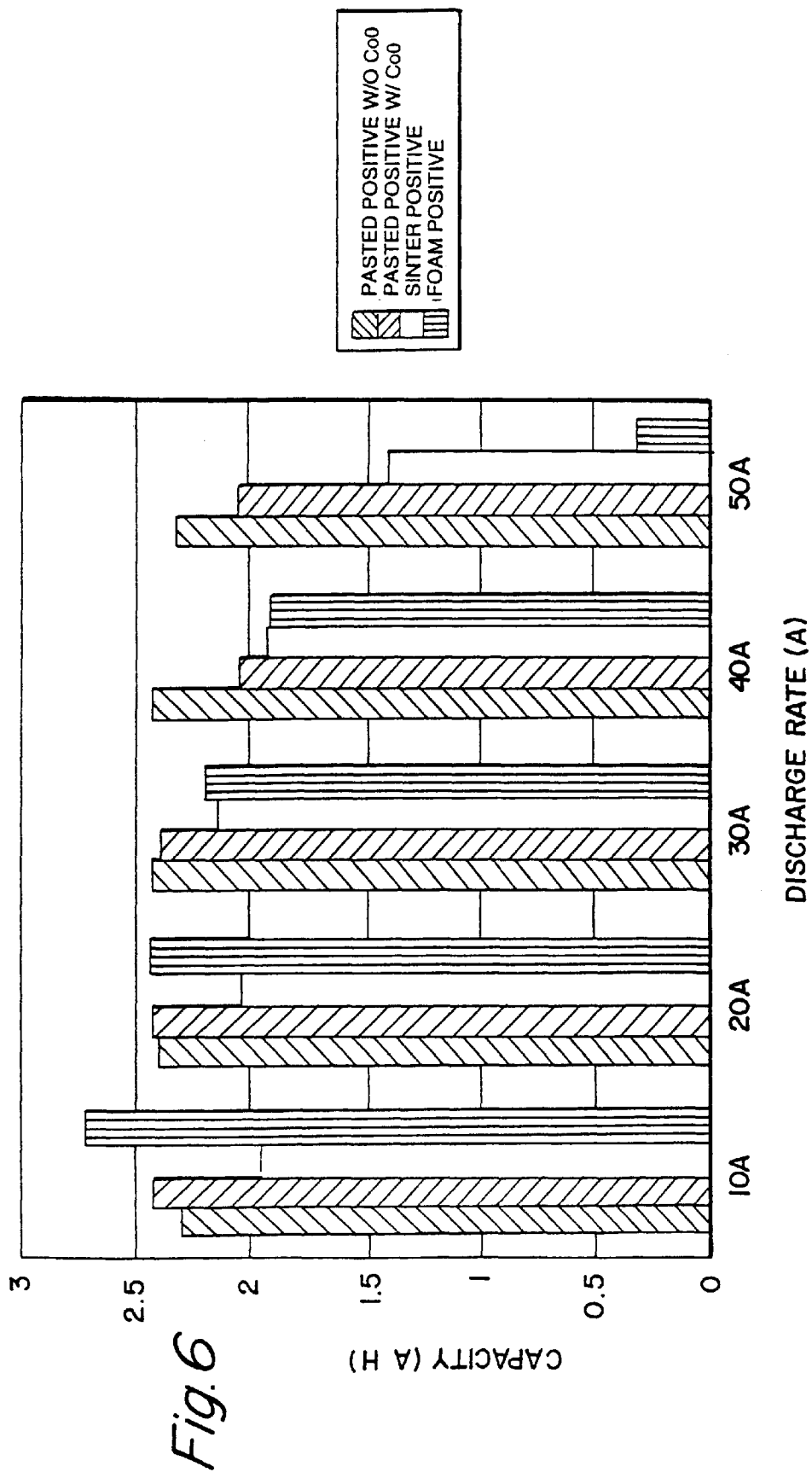
FIG. 6 is a graph showing capacity at various discharge rates of cells using the pasted positive electrode of the present invention compared to cells using sintered positive electrodes and foam positive electrodes.
Figure 7:
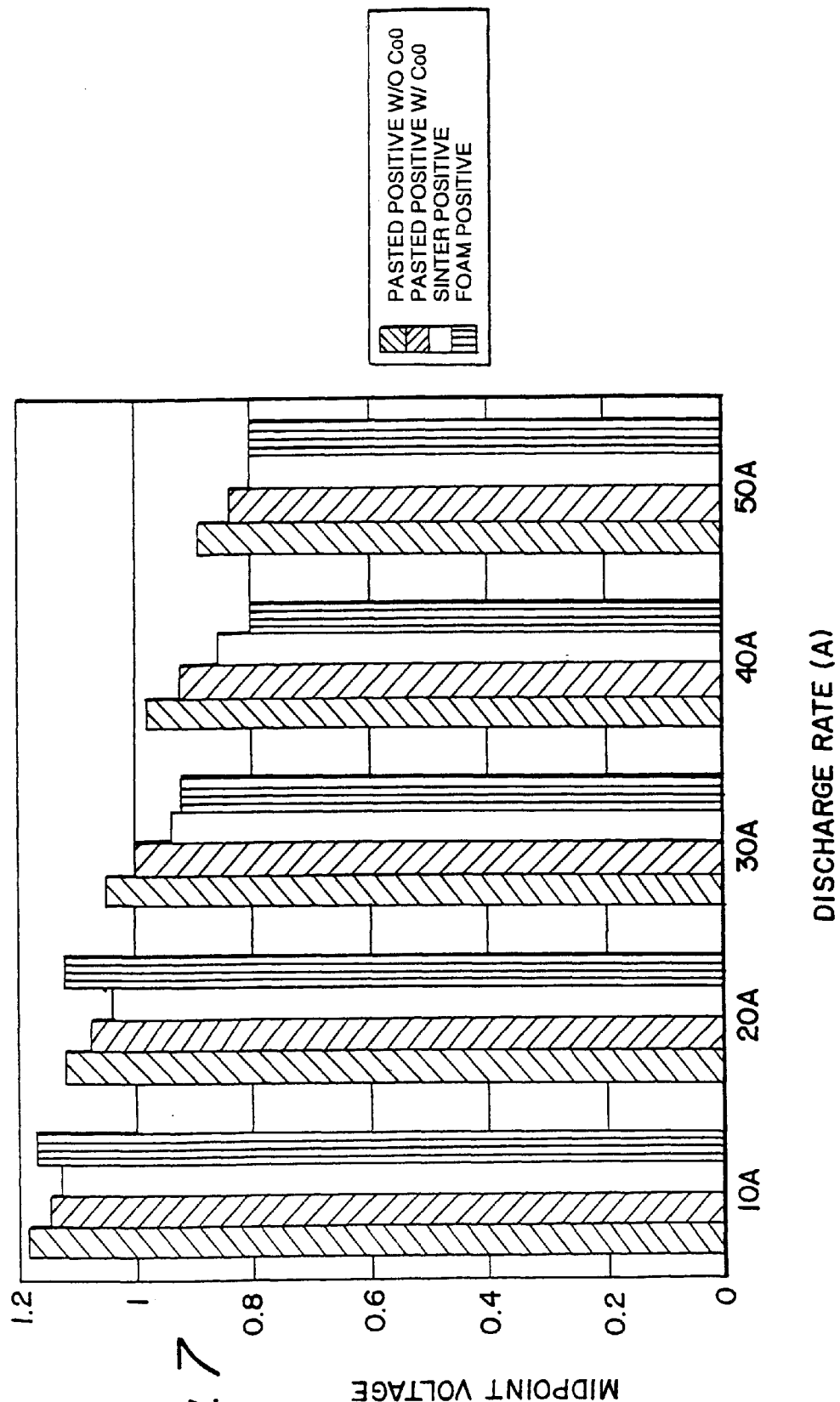
FIG. 7 is a graph showing midpoint voltage at various discharge rates of cells using the pasted positive electrode of the present invention compared to cells using sintered positive electrodes and foam positive electrodes.
Figure 8:
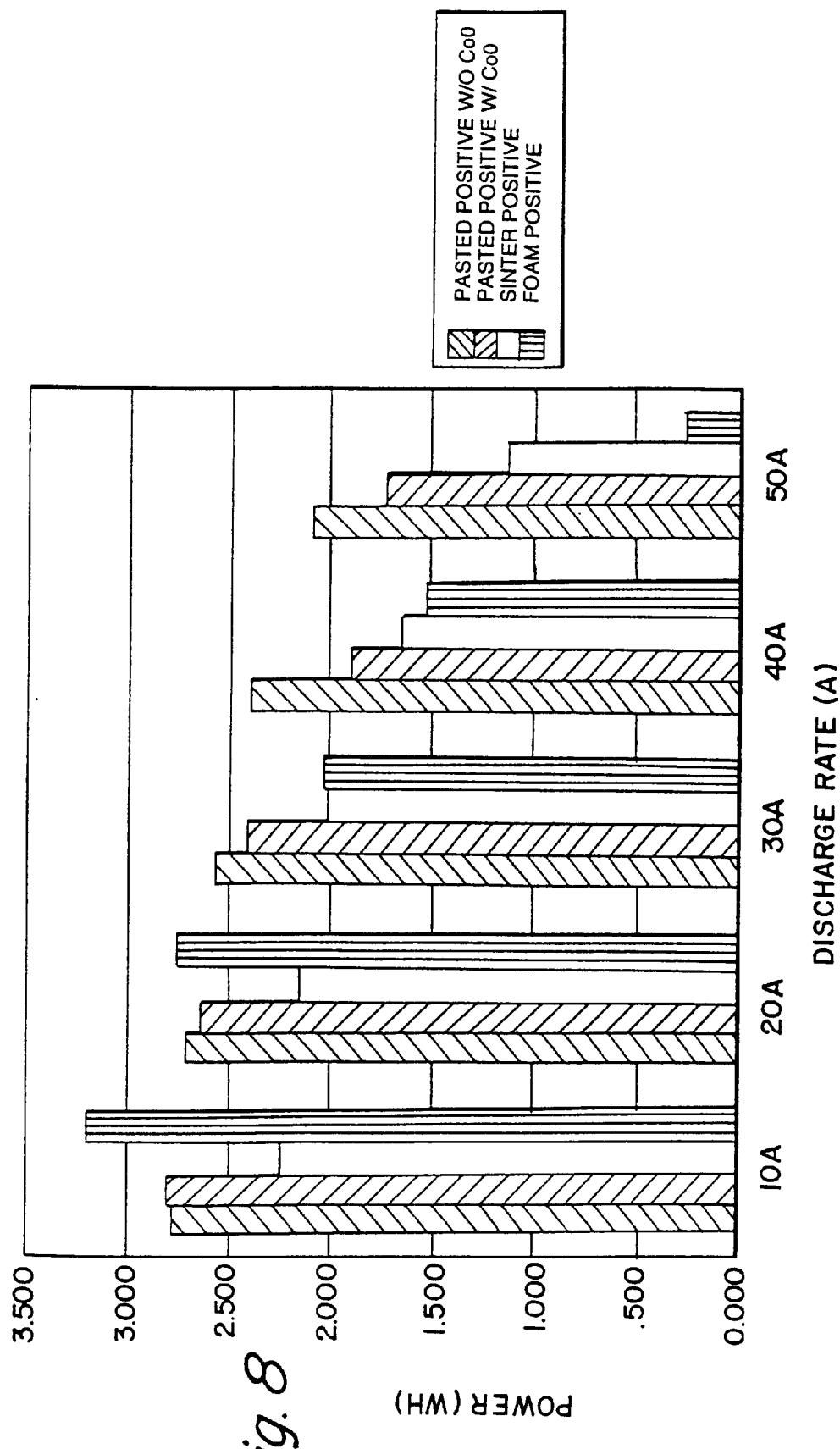
FIG. 8 is a graph showing power delivered at various discharge rates of cells using the pasted positive electrode of the present invention compared to cells using sintered positive electrodes and foam positive electrodes.

In FIGS. 6 through 8, test results evaluating pasted positive electrodes made using formulations from Example 2 (with cobalt oxide additive) and Example 3 (without cobalt oxide additive) are compared with sinter nickel electrodes and foam based nickel electrodes. The cells are all sub C size cells with metal hydride negative electrodes. As shown in FIG. 6, both pasted positive electrode types provide more capacity than those cells containing sinter nickel electrodes at discharge rates up to and including 50 amps and more capacity than the foam based electrode at discharge rates of 30 amps and above. At low to moderate discharge rates, the pasted positive formulation with cobalt oxide provides the higher cell capacity of the pasted nickel electrodes, however at high rates, the capacity of the cells with pasted positive electrodes without CoO is larger. As shown in FIG. 7, the voltage delivery of cells incorporating the pasted positive electrode is higher than those cells with either the sinter positive electrode or foam based positive electrode at discharge rates of 30 amps or more. As the discharge current increases, this advantage becomes more pronounced, and the cell containing the cobalt-free pasted positive electrode outperforms the cell containing the cobalt-containing pasted positive electrode. FIG. 8 compares the power delivery of the cells, which can be estimated by multiplying the cell capacity times the midpoint voltage. Both pasted positive electrode types provide more power than cells incorporating the sinter positive electrode at all discharge rates tested and more than the foam based positive electrode at rates of 30 amps or greater.

Figure 9:
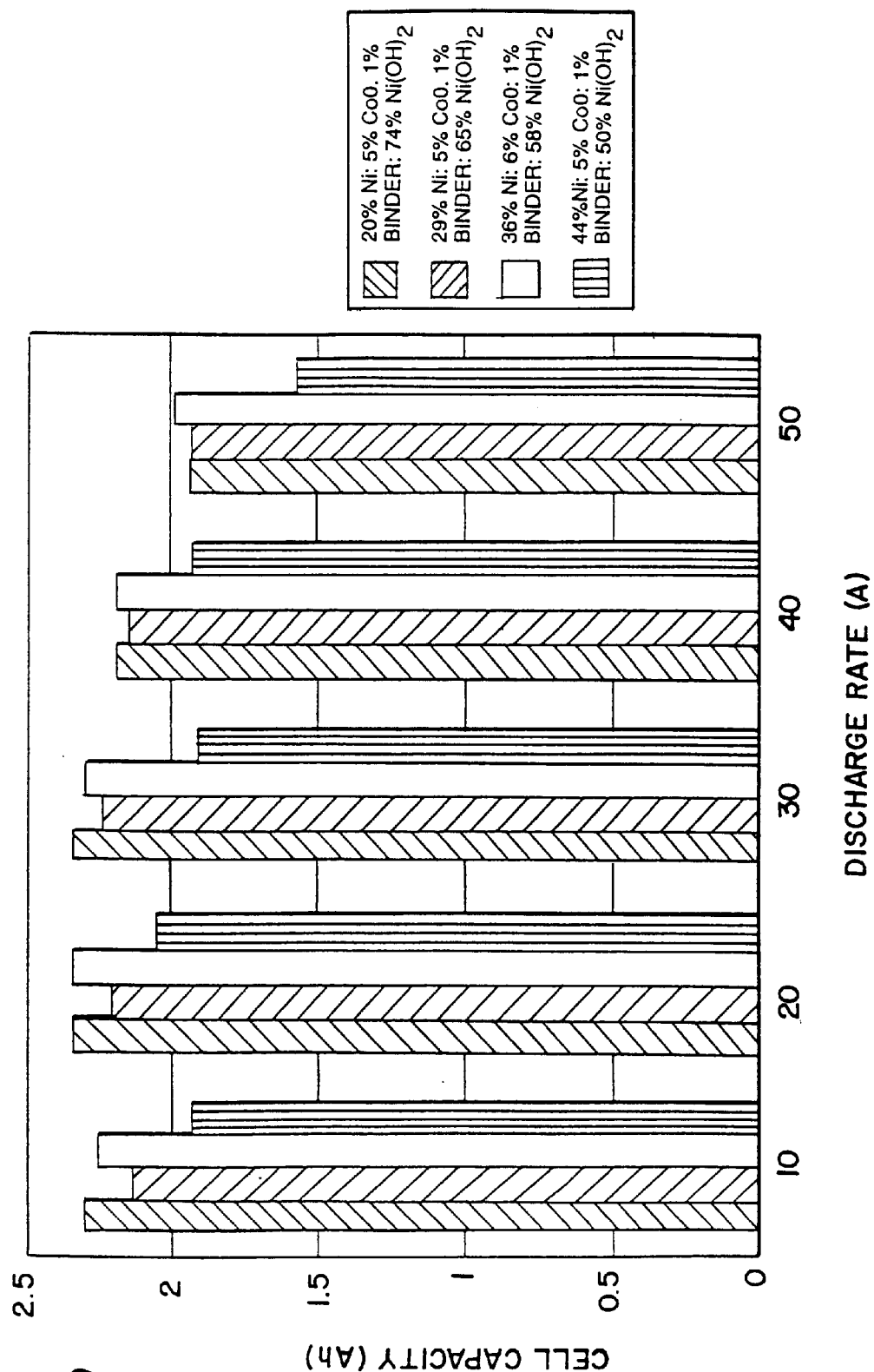
FIG. 9 is a graph showing capacity at various discharge rates of cells using various formulations of the pasted positive electrode of the present invention.

In FIG. 9, the capacity of cells using various formulations of the pasted positive electrode of the present invention are compared. The cells are sub C size cells with metal hydride negative electrodes. The formulations all use Tanaka nickel hydroxide co-precipitated with 3 weight per cent zinc and 2 weight per cent cobalt. The formulations vary by changing the amount of nickel and nickel hydroxide in the paste. The data indicates a lower capacity at all discharge rates for the formulation that has a nickel hydroxide content of less than 50 per cent by weight.

EXAMPLE 4

In this example, positive electrodes are made by the same process as described in Example 1, but graphite and cobalt metal powder are substituted for the nickel 210 and cobalt oxide powder. The amount of graphite added to the paste is preferably in the range of 2–7 per cent by weight to enhance the electrode conductivity. If the amount of graphite added is more than 7 weight per cent, there is significant reduction in electrode energy density due to the low density (2.2 g/cm$^3$) of graphite. If the amount of graphite added is less than 2 weight per cent, the conductive network is not sufficient to yield high electrode utilization and cell capacity is decreased. In addition to the graphite conductive network, using conductive cobalt metal additive instead of non-conductive cobalt oxide can further enhance the electrode conductivity.

The preferred electrode composition as a dry paste in this example is 90.2 weight per cent of the Tanaka co-precipitated nickel hydroxide powder of Example 1, 3.9 weight per cent of graphite powder (from Superior Graphite Co.), 4.9 weight per cent of extra fine cobalt metal powder (from Sogimet), and 1 weight per cent of Kraton®G1654 binder. Sub C cells with the pasted positive electrode and metal hydride negative electrode were assembled using conventional techniques as described above.

Cell performance was compared to cells with a sinter nickel positive electrode. Results are summarized in Table 1 for cell capacity and Table 2 for mid point voltage. As shown in both tables, the performance of cells in this example exceeds that of cells with the sinter nickel electrode.

TABLE 1

| | Cell Capacity (Ah) @ Discharge Current | | | |
|---|---|---|---|---|
| | @ 4 A | @ 10 A | @ 30 A | @ 50 A |
| Example 4 | 2.73 | 2.43 | 2.39 | 2.33 |
| Sinter Positive | 2.25 | 1.80 | 1.80 | 1.79 |

TABLE 2

| | Cell Mid Point Voltage (volt) @ Discharge Current | | | |
|---|---|---|---|---|
| | @ 4 A | @ 10 A | @ 30 A | @ 50 A |
| Example 4 | 1.164 | 1.176 | 1.051 | 0.935 |
| Sinter Positive | 1.114 | 1.160 | 1.014 | 0.880 |

EXAMPLE 5

In this example, cell formation is examined using the sub C size cells described in Example 4. Experimental results show that only about 30% of the cobalt metal is converted to the highly conducive cobalt oxyhydroxide during the initial charge at C/50 rate. As a result of this poor conversion, cell polarization is evident during the subsequent higher rate charging (C/3) of nickel hydroxide active material, due to inefficient electrode conductivity, leading to a reduction of the cell capacity.

Cobalt conversion to CoOOH is accompanied by the consumption of electrolyte as shown in the reactions below:

$$Co+2OH^-\rightarrow Co(OH)_2+2e^-$$

$$Co(OH)_2+OH^-\rightarrow CoOOH+H_2O+e^-$$

It is believed that the presence of surface oxides or inaccessible cobalt sites may result in poor conversion efficiencies. In order to improve the cobalt conversion efficiency, cells were heat treated prior to initial charging. It is believed that the heat soak not only may remove the oxide layer on the cobalt surface but also may improve the electrolyte penetration. This improved penetration is advantageous when the porosity of the electrode coating is low and more difficult to penetrate with electrolyte. Cells were heat treated at 40° C. and 60° C. for one to seven days followed by an initial charge at C/50 rate for 8 hours. Experimental results showed that the highest cobalt conversion efficiency was achieved when heat treatment was carried out at 60° C. for two days. Measurement of the cell impedance indicated a significant reduction from 25 mohm down to 10 mohm. The cobalt conversion efficiency was improved from 30% to about 55%. Subsequent C/3 charge and C discharge of the nickel hydroxide active material showed an utilization improvement of 4% from 80% to 84%.

Although the conversion efficiency is favored by the above methods, subsequent high rate charging at C/3 rate, to convert nickel hydroxide to nickel oxyhydroxide, still shows an initial polarization. This is attributed to the lack of conductivity of the nickel hydroxide, which does not appear to be converted to its conductive oxyhydroxide form in an 8 hour time frame at C/50. Extending the initial charge time from 8 hours to 16 hours partially charges the nickel hydroxide to its more conductive nickel oxyhydroxide, further improving the electrode conductivity. Thus, the polarization on the subsequent C/3 charge cycle is eliminated. Consequently, the electrode utilization improves by an additional 2% going from 84% to 86%.

It should be understood that the examples and embodiments described herein are for illustrative purposes only and that various modifications or changes in light thereof will be suggested to persons skilled in the art and are to be included within the spirit and purview of this application and the scope of the appended claims.

What we claim is:

1. A method of fabricating a positive electrode comprising the steps of:
    a) providing a powder mixture comprising nickel hydroxide active material and a binder wherein said nickel hydroxide is co-precipitated with 3 to 5 weight per cent zinc and 1 to 2 weight per cent cobalt;
    b) combining said powder mixture with a solvent to form a paste;
    c) providing a two-dimensional electrically conductive substrate having at least a first major substrate surface and a second major substrate surface opposing said first surface;
    d) applying said paste to at least a portion of said first and second substrate surfaces; and,
    e) drying said paste to form a final electrode coating, wherein the thickness of said substrate is between 10 and 50 per cent of the thickness of said electrode.

2. A method of fabricating a positive electrode comprising the steps of:
   a) providing a powder mixture comprising between 50 and 90 weight per cent nickel hydroxide powder, 10 and 50 weight per cent nickel powder, 0 and 10 weight per cent cobalt oxide powder, and 0.3 to 5.0 weight per cent binder;
   b) combining said powder mixture with a solvent to form a paste;
   c) providing a two-dimensional electrically conductive substrate having at least a first major substrate surface and a second major substrate surface opposing said first surface;
   d) applying said paste to at least a portion of said first and second substrate surfaces; and,
   e) drying said paste to form a final electrode coating, wherein the thickness of said substrate is between 10 and 50 per cent of the thickness of said electrode.

3. The method of claim 2, wherein said powder mixture comprises between 50 and 75 weight per cent nickel hydroxide powder and 20 and 45 weight per cent nickel powder.

4. A method of fabricating a positive electrode comprising the steps of:
   a) providing a powder mixture comprising nickel hydroxide active material and a binder, wherein said binder is a styrene-ethylene/butylene-styrene triblock copolymer;
   b) combining said powder mixture with a solvent to form a paste;
   c) providing a two-dimensional electrically conductive substrate having at least a first major substrate surface and a second major substrate surface opposing said first surface;
   d) applying said paste to at least a portion of said first and second substrate surfaces;
   e) drying said paste to form a final electrode coating, wherein the thickness of said substrate is between 10 and 50 per cent of the thickness of said electrode.

5. A method of fabricating a positive electrode comprising the steps of:
   a) providing a powder mixture comprising nickel hydroxide active material and a binder;
   b) combining said powder mixture with a solvent to form a paste;
   c) providing a two-dimensional electrically conductive substrate having at least a first major substrate surface and a second major substrate surface opposing said first surface;
   d) applying said paste to at least a portion of said first and second substrate surfaces;
   e) drying said paste to form a final electrode coating, wherein the thickness of said substrate is between 10 and 50 per cent of the thickness of said electrode; and
   f) removing said final electrode coating from a portion of said first or said second substrate surfaces.

* * * * *